Aug. 11, 1936.  A. G. DELANY  2,050,830
APPARATUS FOR COATING WELDING RODS
Filed Dec. 30, 1931
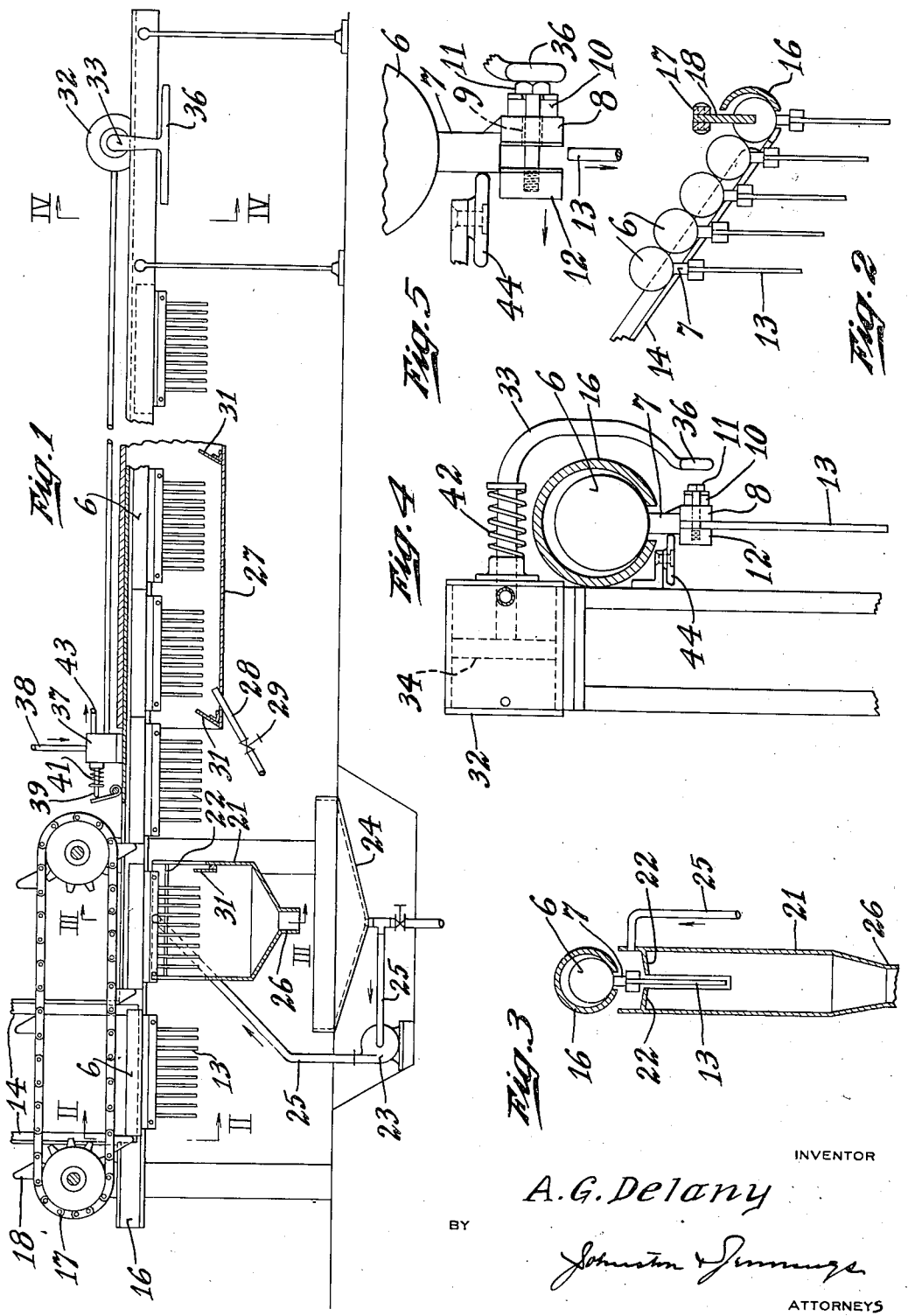
INVENTOR
A.G. Delany
BY
Johnston & Jennings
ATTORNEYS

UNITED STATES PATENT OFFICE 2,050,830

APPARATUS FOR COATING WELDING RODS

Albanus Groome Delany, Alabama City, Ala., assignor to Gulf States Steel Company, a corporation of Delaware Application December 30, 1931, Serial No. 583,887

11 Claims. (Cl. 91—43)

My invention relates to an improved method and apparatus for applying a uniform coating of liquid fluxing material to the surface of welding rods and by which, one end of the rod is left uncoated to provide an uninsulated contact surface when the rod is mounted for use in a welding machine.

An object of my invention is to provide a carrier preferably in the form of a cartridge, adapted to clamp a plurality of rods in vertical position and hold them in spaced relation to each other.

Another object of my invention is to provide a simple and inexpensive means for propelling the cartridges from station to station where the various operations for coating the rods are performed.

A further object of my invention is to provide means adapted to apply a uniform coating on the rods and which will prevent the formation of air bubbles and pin holes in the coating.

Another object of my invention is to provide means adapted to automatically discharge the welding rods from the cartridges at the completion of the coating operations.

Briefly, my invention comprises a plurality of cartridges each adapted to have a plurality of rods loaded thereinto in any convenient manner and to clamp and hold such rods in spaced relation to each other. The loaded cartridges are fed by gravity onto a track and into position to be engaged by the lugs provided on an endless chain which acts on the rearward cartridges to propel it and the preceding cartridges towards the discharge end of the track. As the cartridges move along the track, a coating is applied to the welding rods and any excess having been removed the coating is then dried by an air blast, after which the rods are automatically released from the cartridges by means of an air cylinder controlled by the cartridge propelling chain.

Apparatus embodying features of my invention is illustrated in the accompanying drawing, forming a part of this application, in which:—

Fig. 1 is a view partly in section and partly in side elevation illustrating my improved coating machine;

Fig. 2 is a sectional view taken along the line II—II of Fig. 1 to illustrate the manner in which the loaded cartridges are fed onto the track by gravity;

Fig. 3 is a sectional view taken along the line III—III of Fig. 1, showing a cartridge positioned in the coating chamber;

Fig. 4 is a sectional view taken along the line IV—IV of Fig. 1, showing the cartridge with its clamp jaws in closed position ready to be opened by the air cylinder to discharge the coated rods; and Fig. 5 is an enlarged fragmentary detail view showing the movable rod clamping jaws of a cartridge in open position.

Referring now to the drawing, I show a plurality of similar cartridges 6 each of which is provided with a rigid offset member 7. A stationary jaw 8 is rigidly secured to the member 7 and provided with holes 9 adapted to receive bolts 11. The threaded ends of these bolts are secured in threaded openings formed in a movable jaw 12 and the opposite ends of the bolts are engaged by a flat compression spring 10 which acts to press the movable jaw against the stationary jaw 8. The opposing faces of the jaws 8 and 12 are each provided with a layer of rubber to provide better gripping surfaces between which the rods 13 are grasped and by which they are held firmly in spaced parallelism while being coated.

The rods 13 are typical welding rods and they are loaded in the cartridge 6 by a machine (not shown) and the loaded cartridges are fed by gravity down a pair of inclined angle iron guide members 14 onto the track 16. An endless propeller chain 17 is located over the loading end of the track 16 and provided with a plurality of equally spaced lugs 18 adapted to engage with and propel the cartridges along the track. It will be seen, by referring to Fig. 1 of the drawing, that the lugs engage only two or three cartridges which in turn act against the preceding cartridges to propel them the remaining distance along the track. A short endless chain 17 may thus be used and it can be driven by an electric motor or other means (not shown).

The first operation, as the cartridges move along the track 16, is to apply the coating material on the depending rods 13. The apparatus I employ for this operation is shown in Fig. 3 and comprises a housing 21 provided with inwardly inclined ledges 22 spaced for the passage of the rods between them. The coating material is drawn by a pump 23 from the reservoir 24 through pipes 25 and forced into the housing 21 so as to fall into the trough formed by the ledges 22 over the free edges of which it falls in sheets over the surface of the rods to be coated. The surplus coating material then passes down through the outlet 26 to the reservoir.

A coating material is thus maintained in constant circulation to prevent the settling of the coating matter that is in suspense therein and it is supplied in sufficient volume to the upper trough formed by the ledges 22 as to be distributed throughout this trough and to pass onto both ledges 22 and to cascade therefrom with a smooth unagitated flow which will prevent the spattering of the cartridges and prevent the upper ends of the rods from having any coating matter splashed or sprayed thereon so that they are kept clean and in suitable condition for electrical connection to the welding apparatus. This easy, quiet overflowing or cascading action of the constantly circulating mass of coating material maintains the uniformity of the mixture and as the material flows downwardly over the rods it will not tend to entrain air bubbles or to cause a faulty, incomplete or non-uniform application of coating to the depending rods.

After the rods have been thus coated, they are passed through a housing 27 where the coating is dried and hardened. Although heat may be employed to dry the coating on the rods, it has been found by experiments that currents of unheated air will produce the best results. Air under pressure to create these currents passes into the housing 27 through a pipe 28 under control of the valve 29.

Wiper strips 31 are located at suitable distances from each other throughout the length of the apparatus to remove accumulations of excess coating material which form at the lower ends of the rods.

At the discharge end of the track 16 I provide a transverse air cylinder 32 having an arm 33 secured to its piston 34. A cross member 36 is formed on the end of the arm and disposed for engagement with the bolts 11 to force the movable jaw 12 away from the stationary jaw 8 of a cartridge, thereby discharging the rods 13 from the cartridge as shown in Fig. 5. A three way valve 37, interposed in the air line 38 leading to the cylinder 32, is opened at intervals by the lugs 18 being timed to act, as each loaded cartridge moves opposite the member 36, to press the valve stem 39 inwardly and actuate the cylinder. When released the valve is closed by a compression spring 41. The valve action is such as to produce a quick thrust and release of member 36 to discharge the rods, this action preferably occurring while the train of cartridges is momentarily at rest due to the take up of the space left in the cartridge train by the valve actuating lug.

After the rods have been discharged from a cartridge the three way valve quickly closes and the piston and arm are moved to their inoperative position by the compression spring 42 while the air in the cylinder and pipe line 38 escapes through the outlet pipe 43.

The cartridges 6 are held against rotation, when the rods are being discharged, by a roller 44 which engages the member 7 above and opposite to the movable jaw 12.

A suitable conveyor may be provided if desired to return the cartridges from the discharge end to the loading end of the track.

After numerous experiments in applying the coating material to the rods, I have found that the pouring method described herein and shown in the drawing is superior to the usual methods employed such as spraying and immersion baths as the rods are thoroughly covered and the coating thereon will be found to be free of air pockets and pin holes and the upper ends of the rods are uniformly clean.

It will also be observed that the rods are maintained vertically throughout the entire operation in order that a uniform coating will be formed on the finished product.

While I have shown my invention in but one form, it will be obvious to those skilled in the art that it is not so limited, but is susceptible of various changes and modification, without departing from the spirit thereof, and I desire, therefore, that only such limitations shall be placed thereupon as are imposed by the prior art or as are specifically set forth in the appended claims.

What I claim is:—

1. In apparatus of the class described, a track, disconnected cartridges, means on the cartridges adapted to secure thereto a plurality of rods to be coated, pusher means adapted to propel the cartridges along said track, means adapted to pour coating material over the rods, air drying means adapted to dry the coating material on the rods, and means adapted to remove accumulations of coating material from the ends of the coated rods.

2. In apparatus of the class described, a slotted track, disconnected carriers each elongated and adapted to be received in said track and to support in spaced relation a plurality of vertical rods to be coated which depend through and below said slot in position to be coated, means to deliver coating onto said rods, and pusher means adapted by endwise interengagement of the carriers one with the other to propel them along said track.

3. In apparatus of the class described, a tubular slotted track, disconnected carriers each adapted to slidably fit in the track and elongated to receive a group of spaced rods to be coated which depend through the slot and are aligned with said track, means adapted to propel the carriers by engagement one with the other along said track, and means operable transversely to said track to effect the automatic discharge of the group of rods from each carrier successively.

4. In combination with a rod coating means and drying means, a track, disconnected cartridges adapted to receive rods to be coated, pusher means adapted by engaging one or more cartridges to push other cartridges ahead of them with an intermittent movement in a train along said track, and means at the discharge end of the track remotely controlled by the pusher means and adapted to automatically discharge the rods from the cartridges successively while the train is at rest.

5. In apparatus of the class described, a track, disconnected cartridges, means on the cartridges adapted to secure thereto a plurality of spaced rods to be coated, means adapted to propel the cartridges along said track, and means, comprising a trough elongated in the direction of the track, adapted to circulate coating material and deliver it in a downflowing cascade from opposite sides and at a level below the cartridges onto the rods to coat them.

6. In apparatus of the class described, a track, disconnected cartridges, means on the cartridges adapted to secure thereto a plurality of rods to be coated, means adapted to propel the cartridges along said track, means adapted to circulate coating material, a trough adapted to deliver same in a gently flowing cascade downwardly onto the rods below their engagement with the cartridges, and air drying means adapted to dry the coating material on the rods.

7. In apparatus of the class described, a track having a loading end and discharge end, disconnected cartridges, jaws provided on the cartridges to receive and hold a plurality of rods to be coated, means adapted to feed the loaded cartridges onto the track, pusher means adapted to engage with the cartridges at the loading end of the track and through them to move the preceding cartridges along the track, means adapted to circulate a coating material and pour same over the rods, and means adapted to dry the coating material on the rods.

8. In apparatus of the class described, a track having a loading end and discharge end, disconnected cartridges, jaws provided on the cartridges to receive and hold a plurality of rods to be coated, means adapted to feed the loaded cartridges onto the track, pusher means adapted by engagement with the cartridges at the loading end of the track to move the preceding cartridges along the track, means adapted to pour coating material in a gentle cascade from both sides over the rods below the cartridge carrying them, means adapted to dry the coating material on the rods, and means controlled by the pusher means to open the jaws of the cartridge to release the rods at the discharge end of the track.

9. In apparatus of the class described having a loading end and a discharge end, elongated disconnected cartridges, spring actuated clamping jaws provided on the cartridges to receive a plurality of spaced rods to be coated, means adapted to feed the loaded cartridges onto the loading end of the track with their rows of rods in alignment, an endless chain provided with lugs for engagement with the cartridges in the loading end of the track and adapted through them to push the preceding cartridges along the track, means adapted to pour coating material onto the rods below the cartridges, means adapted to dry the coating material on the rods, means to wipe accumulation of coating material from the ends of the rods, and means controlled by the endless chain to open the jaws on the cartridge to release the rods at the discharge end of the track.

10. In apparatus of the class described, conveyor means for welding rods adapted to present the rods in vertical spaced realtionship in line with its travel, an elongated coating tank having a top trough with a narrow bottom slot through which the upper ends of the rods travel, and means to supply coating liquid to said trough which is adapted to cause it to flow evenly by gravity downwardly into contact with the upper ends of the passing rods.

11. In combination with a rod coating means and drying means, a track, disconnected cartridges, means on the cartridges adapted to secure to each a row of spaced rods to be coated, means adapted to feed the loaded cartridges onto the track, pusher means adapted to engage the rearmost cartridges and through them to propel all of the cartridges ahead of them with an intermittent movement along said track, and automatic means adapted to discharge the rods from the cartridges after they successively pass the drier, said means being energized by the pusher means while the cartridge opposite it is at rest.

ALBANUS GROOME DELANY.